United States Patent
Mondello et al.

(10) Patent No.: US 11,570,625 B2
(45) Date of Patent: Jan. 31, 2023

(54) SECURE VEHICLE COMMUNICATIONS ARCHITECTURE FOR IMPROVED BLIND SPOT AND DRIVING DISTANCE DETECTION

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

(*) Notice: Subject to any disclaimer, the term of this patent is extended or adjusted under 35 U.S.C. 154(b) by 279 days.

(21) Appl. No.: 16/363,054

(22) Filed: Mar. 25, 2019

(65) Prior Publication Data
US 2020/0314636 A1    Oct. 1, 2020

(51) Int. Cl.
| | |
|---|---|
| *H04L 9/32* | (2006.01) |
| *H04W 12/50* | (2021.01) |
| *G01S 5/00* | (2006.01) |
| *H04W 4/46* | (2018.01) |
| *G07C 5/00* | (2006.01) |
| *H04W 12/069* | (2021.01) |
| *H04W 12/69* | (2021.01) |
| *H04W 12/63* | (2021.01) |

(52) U.S. Cl.
CPC .......... *H04W 12/50* (2021.01); *G01S 5/0072* (2013.01); *G07C 5/008* (2013.01); *H04W 4/46* (2018.02); *H04W 12/069* (2021.01); *H04W 12/63* (2021.01); *H04W 12/69* (2021.01)

(58) Field of Classification Search
CPC ....... H04W 12/50; H04W 4/46; H04W 12/69; H04W 12/069; H04W 12/63; G01S 5/0072; G07C 5/008
USPC .......................................................... 713/168
See application file for complete search history.

(56) References Cited

U.S. PATENT DOCUMENTS

| | | | | | |
|---|---|---|---|---|---|
| 8,548,647 | B2* | 10/2013 | Nemoto | ............. | B60K 31/0058 701/2 |
| 8,635,681 | B2* | 1/2014 | Zhang | ..................... | H04L 63/20 726/6 |
| 9,333,971 | B1* | 5/2016 | Han | ....................... | B60W 30/16 |
| 9,646,428 | B1* | 5/2017 | Konrardy | .............. | B60W 30/16 |

(Continued)

OTHER PUBLICATIONS

"V2X Use Case: Forward Collision Warning", S1-150242, Qualcomm Incorporated et al., Feb. 2-6, 2015.

(Continued)

*Primary Examiner* — Kerri L McNally
*Assistant Examiner* — Thang D Tran
(74) *Attorney, Agent, or Firm* — Greenberg Traurig

(57) ABSTRACT

Disclosed are techniques for improving an advanced driver-assistance system (ADAS) using a secure channel area. In one embodiment, a method is disclosed comprising establishing a secure channel area extending from at least one side of a first vehicle; detecting a presence of a second vehicle in the secure channel area; establishing a secure connection with the second vehicle upon detecting the presence; exchanging messages between the first vehicle and the second vehicle, the messages including a position and speed of a sending vehicle; taking control of a position and speed of the first vehicle based on the contents of the messages; and releasing control of the position and speed of the first vehicle upon detecting that the secure connection was released.

20 Claims, 8 Drawing Sheets

(56) References Cited

U.S. PATENT DOCUMENTS

| | | | | |
|---|---|---|---|---|
| 9,948,762 B2* | 4/2018 | Juzswik | | H04B 5/0031 |
| 10,089,876 B1* | 10/2018 | Ramasamy | | G08G 1/167 |
| 10,259,456 B2* | 4/2019 | Park | | B60W 30/18163 |
| 10,354,460 B2* | 7/2019 | Ricci | | B60L 50/53 |
| 10,616,734 B1* | 4/2020 | Lekutai | | G08G 1/0965 |
| 10,768,297 B2* | 9/2020 | Shelton | | G01S 13/58 |
| 2004/0149504 A1* | 8/2004 | Swoboda | | G01S 13/931 |
| | | | | 180/169 |
| 2006/0015242 A1* | 1/2006 | Yoshida | | G08G 1/161 |
| | | | | 701/96 |
| 2008/0232583 A1* | 9/2008 | Di Crescenzo | | H04L 9/08 |
| | | | | 380/44 |
| 2010/0214085 A1* | 8/2010 | Avery | | G08G 1/161 |
| | | | | 340/435 |
| 2011/0021234 A1* | 1/2011 | Tibbitts | | H04W 4/40 |
| | | | | 455/517 |
| 2011/0238987 A1* | 9/2011 | Kherani | | H04L 63/0823 |
| | | | | 713/168 |
| 2013/0029604 A1* | 1/2013 | Saito | | H04W 76/19 |
| | | | | 455/41.2 |
| 2013/0141247 A1* | 6/2013 | Ricci | | G06F 13/14 |
| | | | | 340/870.01 |
| 2013/0307978 A1* | 11/2013 | Kriel | | G06K 9/3216 |
| | | | | 348/148 |
| 2014/0012494 A1* | 1/2014 | Cudak | | G01C 21/3415 |
| | | | | 701/412 |
| 2014/0118130 A1* | 5/2014 | Chang | | B60Q 5/006 |
| | | | | 340/435 |
| 2014/0172265 A1* | 6/2014 | Funabashi | | G08G 1/22 |
| | | | | 701/96 |
| 2014/0229525 A1* | 8/2014 | Crawford | | H04L 29/06319 |
| | | | | 709/203 |
| 2015/0035977 A1* | 2/2015 | Schrepfer | | H04N 5/44 |
| | | | | 348/143 |
| 2015/0052352 A1* | 2/2015 | Dolev | | H04L 9/3278 |
| | | | | 713/156 |
| 2015/0327028 A1* | 11/2015 | Zhang | | H04L 67/12 |
| | | | | 455/452.1 |
| 2016/0012653 A1* | 1/2016 | Soroko | | G07C 5/0808 |
| | | | | 340/5.61 |
| 2016/0200318 A1* | 7/2016 | Parikh | | G01S 13/931 |
| | | | | 701/96 |
| 2016/0285863 A1* | 9/2016 | Canavor | | H04L 63/0823 |
| 2017/0053534 A1* | 2/2017 | Lokesh | | H04L 67/12 |
| 2017/0124864 A1* | 5/2017 | Popple | | B60W 10/20 |
| 2017/0124869 A1* | 5/2017 | Popple | | G08G 1/087 |
| 2017/0132477 A1* | 5/2017 | Kim | | G08G 1/096791 |
| 2017/0166115 A1* | 6/2017 | Pal | | G08G 1/149 |
| 2017/0180989 A1* | 6/2017 | Etzel | | H04L 9/088 |
| 2017/0214746 A1* | 7/2017 | Zettler | | G01S 7/006 |
| 2017/0248949 A1* | 8/2017 | Moran | | G08G 1/162 |
| 2017/0330456 A1* | 11/2017 | Miller | | G08G 1/096775 |
| 2018/0084511 A1* | 3/2018 | Wu | | H04L 67/12 |
| 2018/0137697 A1* | 5/2018 | Dudar | | G07C 5/0808 |
| 2018/0184245 A1* | 6/2018 | Park | | H04W 4/023 |
| 2018/0239349 A1* | 8/2018 | Rasmussen | | B60H 1/00735 |
| 2018/0253976 A1* | 9/2018 | Inam | | H04W 4/44 |
| 2018/0335785 A1* | 11/2018 | Miller | | B60W 50/0098 |
| 2018/0362032 A1* | 12/2018 | Yang | | B60W 10/20 |
| 2018/0367514 A1* | 12/2018 | Kido | | H04W 12/0431 |
| 2019/0001977 A1* | 1/2019 | Lin | | B60W 30/143 |
| 2019/0061759 A1* | 2/2019 | Tomishima | | G08G 1/00 |
| 2019/0068582 A1* | 2/2019 | Kim | | G01S 5/0284 |
| 2019/0143967 A1* | 5/2019 | Kuti | | G05D 1/0257 |
| | | | | 701/23 |
| 2019/0206254 A1* | 7/2019 | Tao | | G08G 1/163 |
| 2019/0225142 A1* | 7/2019 | Switkes | | B60Q 1/50 |
| 2019/0250639 A1* | 8/2019 | Xu | | G08G 1/096827 |
| 2019/0318631 A1* | 10/2019 | Seaman | | G06Q 20/223 |
| 2019/0325125 A1* | 10/2019 | Pantfoerder | | H04L 63/0823 |
| 2019/0387378 A1* | 12/2019 | Willis | | G08G 1/096791 |
| 2020/0120505 A1* | 4/2020 | Kim | | H04W 12/062 |
| 2020/0287726 A1* | 9/2020 | Garnier | | H04W 12/108 |
| 2021/0327268 A1* | 10/2021 | Troia | | G08G 1/096791 |

OTHER PUBLICATIONS

International Search Report and Written Opinion, PCT/US2020/021370, dated Jul. 2, 2020.

* cited by examiner

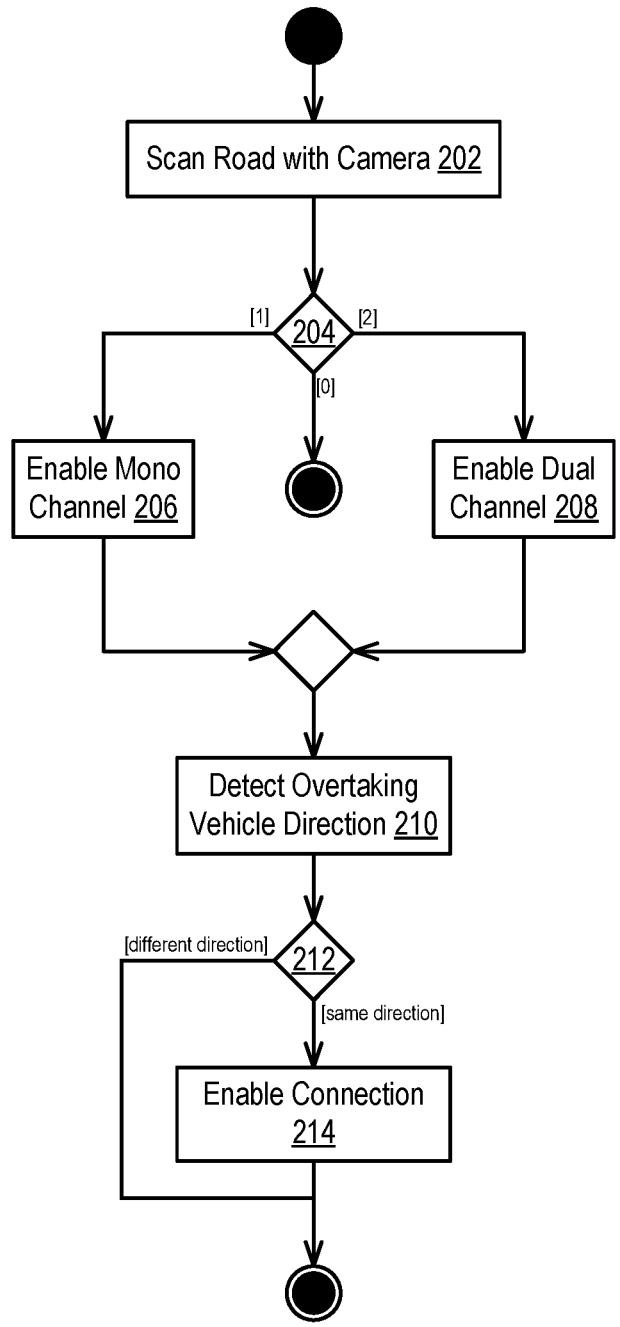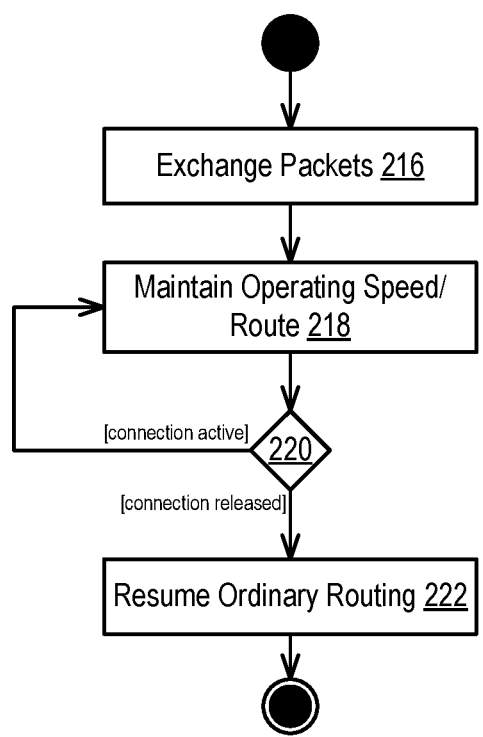
FIG. 2A
FIG. 2B

SECURE VEHICLE COMMUNICATIONS ARCHITECTURE FOR IMPROVED BLIND SPOT AND DRIVING DISTANCE DETECTION

CROSS-REFERENCE TO RELATED APPLICATIONS

This application is related to U.S. application Ser. No. 15/993,119, filed May 30, 2018 entitled "TRANSMISSION OF VEHICLE ROUTE INFORMATION BY PASSIVE DEVICES" and U.S. application Ser. No. 16/034,809, filed Jul. 13, 2018 entitled "SECURE VEHICULAR SERVICES COMMUNICATION" each of which is incorporated by reference in its entirety.

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward autonomous vehicles and, specifically, to systems for utilizing a secure communication channel to control a vehicle with respect to other vehicles.

Currently, many vehicles employ advanced driver-assistance systems. An advanced driver-assistance system (ADAS) is a system that provides feedback or automatically controls a vehicle in response to a defined input. One example of an ADAS is a blind spot detection system. Another example is a system that maintains a safe following distance of a vehicle with respect to other vehicles. Both system suffer from significant technical problems.

Current blind spot ADASs are installed in non-autonomous vehicles and are mandatory in autonomous vehicles. These systems currently rely on sensor-based techniques such as detecting the presence of vehicles in a blind spot by using light emitting diodes or utilizing sonar to detect a vehicle within a certain distance of a vehicle. While these systems work in ideal conditions, they suffer significantly in poor weather conditions and, in general, are subject to environmental factors that could result in false positives and other negative detection conditions.

Current following distance ADASs similarly rely on sensor-based measurements. In many systems, a safe following distance is calculated empirically as the square of a portion of the vehicles speed. For example, a vehicle traveling at 80 km/h will utilize a following distance of 8×8 or 64 m; a vehicle operating at 120 km/h will seek to maintain a distance of 12×12 or 144 m. Like blind spot detection, current following distance systems rely on sensor measurements such as LiDAR, radar, sonar, etc. to detect the distance between the vehicle and a vehicle in front (and, in some cases, behind) the vehicle. Since these systems rely on sensor measurements they too also suffer from poor weather conditions and other environmental factors.

SUMMARY

Disclosed herein are methods, computer-readable media, and devices for improving ADASs using a secure communication channel.

In a first set of embodiments, the disclosure describes an improved blind spot detection ADAS. In these embodiments, a secure communication channel is created for vehicles on a roadway. As vehicles approach the blind spot area of a vehicle (the "target vehicle"), the approaching vehicles and the target vehicle authenticate and exchange identification information and, subsequently, repeatedly transmit positioning information until the target vehicle is overtaken, thus ensuring that the target vehicle does not impact the overtaking vehicle(s), and vice-a-versa. In operation, a secure communications channel is established between the target vehicle and overtaking vehicle(s) using a DICE-RIoT protocol. This secure channel is established with all vehicles in a secure channel area which can contain up to two vehicles. In some embodiments, the secure channel area can be modified based on solid lines on the roadway (e.g., indicating only one lane is near the vehicle, thus reducing the number of vehicles in the secure area to one). Further, the absence or presence of a vehicle in the secure channel area will adjust the number of available spaces for communicating in the area. Likewise, only vehicles travelling in the same direction may be included in the secure channel area. Once the channel is established, the vehicles transmit position (left/right), direction, speed, and freshness data to control the operations of each vehicle.

In a second set of embodiments, an improved following distance ADAS is disclosed. Like the improved blind spot detection ADAS, the disclosure describes a secure channel established between a target vehicle and vehicles in front of (or behind) the target vehicle within a secure channel area. The vehicles exchange messages including their position (e.g., GPS or Visual GPS), direction, speed, freshness etc. In one embodiment, the target vehicle can adjust its speed based on the messages received from a vehicle in front of the target vehicle. Additionally, the target vehicle may detect an obstacle in the road and recursively transmits its speed or position adjustment to the vehicle behind it, thus allowing the immediately following vehicle (and, by proxy, all other vehicles behind that vehicle) to adjust their speed or position accordingly, forming an effective (yet, temporary) "platoon" of vehicles responding to an obstacle.

As described above, each ADAS utilizes a secure channel area. The secure channel can have a variable shape and it can be defined using any other technology available on the vehicle such as LiDAR, radar, cameras, etc., or embedded tags in the road. The communication distance between vehicles can be in a range of a couple of meters between the target vehicle and the other vehicle(s). The secure channel area is build using the DICE-RIoT specifications. The vehicle must be logged in in the road, the vehicle should have an identification number and a key to communicate properly and being recognized, and a solid lane departure is considered as a street barrier and the vehicles are not authenticated.

In one embodiment, a method is disclosed comprising establishing a secure channel area extending from at least one side of a first vehicle; detecting a presence of a second vehicle in the secure channel area; establishing a secure connection with the second vehicle upon detecting the presence; exchanging messages between the first vehicle and the second vehicle, the messages including a position and speed of a sending vehicle; taking control of a position and speed of the first vehicle based on the contents of the messages; and releasing control of the position and speed of the first vehicle upon detecting that the secure connection was released.

In another embodiment, a non-transitory computer readable storage medium for tangibly storing computer program instructions capable of being executed by a computer processor is disclosed, the computer program instructions defining the steps of: establishing a secure channel area extending from at least one side of a first vehicle; detecting a presence of a second vehicle in the secure channel area; establishing a secure connection with the second vehicle upon detecting the presence; exchanging messages between the first vehicle and the second vehicle, the messages including a position and speed of a sending vehicle; taking control of a position and speed of the first vehicle based on the contents of the messages; and releasing control of the position and speed of the first vehicle upon detecting that the secure connection was released.

In another embodiment, a device is disclosed comprising: a processor; and a storage medium for tangibly storing thereon program logic for execution by the processor, the stored program logic comprising: logic, executed by the processor, for establishing a secure channel area extending from at least one side of a first vehicle, logic, executed by the processor, for detecting a presence of a second vehicle in the secure channel area, logic, executed by the processor, for establishing a secure connection with the second vehicle upon detecting the presence, logic, executed by the processor, for exchanging messages between the first vehicle and the second vehicle, the messages including a position and speed of a sending vehicle, logic, executed by the processor, for taking control of a position and speed of the first vehicle based on the contents of the messages, and logic, executed by the processor, for releasing control of the position and speed of the first vehicle upon detecting that the secure connection was released.

The embodiments provide numerous advantages over existing ADAS systems. First, in both sets of embodiments, all messages are securely transmitted and the identity of vehicles cannot be tampered with. Second, the embodiments can function accurately regardless of the weather conditions or other environmental factors. Third, the transmission of actual vehicle data between vehicles improves the response actions of other vehicles beyond merely avoiding collision and allows for temporary platooning to avoid obstacles that previous systems would not see until within striking range. These, and other factors, represent significant technical improvements over existing ADASs, the details of which are described in more detail below.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

FIG. 2A is a flow diagram illustrating a method for maintaining a connection pool according to some embodiments of the disclosure.

FIG. 2B is a flow diagram illustrating a method for controlling a target vehicle by a blind spot detection system according to some embodiments of the disclosure.

DETAILED DESCRIPTION

Figure 1:
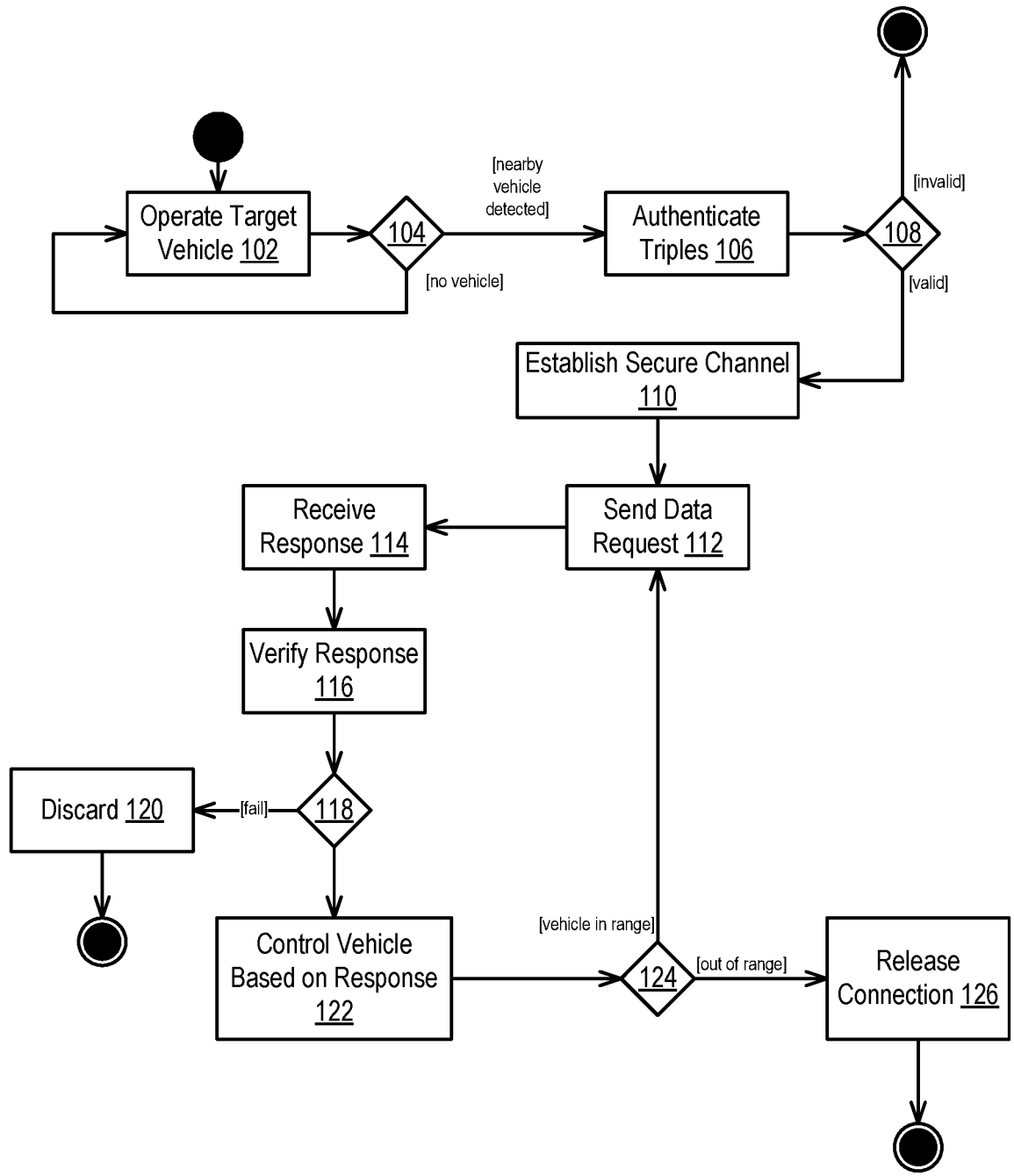
FIG. 1 is a flow diagram illustrating method for controlling a vehicle based on secure messages transmitted with another vehicle according to some embodiments of the disclosure.

FIG. 1 is a flow diagram illustrating method for controlling a vehicle based on secure messages transmitted with another vehicle according to some embodiments of the disclosure.

In step 102, the method operates a vehicle on a roadway.

In one embodiment, step 102 includes logging a vehicle into a roadway. Details of logging into a roadway are described more fully in commonly own application Ser. No. 16/034,763 filed Jul. 13, 2018 and entitled "Secure Vehicular Communication" and the details of this process are not repeated herein for the sake of clarity, but are briefly summarized. Details of triple generation and identity verification software described more fully in FIGS. 4A and 4B, the details of which are incorporated by reference in their entirety. In short, each vehicle and the roadway can be identified by data structure having a form:

$$\{ID_{L1public}, ID_{L1}\text{certificate}, K_{L1public}\} \qquad \text{EQUATION 1}$$

This triple is used to verify the identity of message senders as well used to digitally sign messages transmitting among the parties. As will be described in FIG. 4A, a RIoT-based system includes multiple "layers" of code (Layer 0, Layer 1, Layer 2, . . . N). Each layer is associated with a triple that can be used to authenticate the code. In the illustrated embodiment, a message sender transmits its $L_1$ triple when sending a message to validate the message. When forwarding a message, the forward generates a triple using the next layer of software ($L_2$) and so forth. An $L_2$ triple is generated based on the received $L_1$ triple of the sender and thus the cascading nature of the triple generation ensures that man-in-the-middle attacks are prevented.

In one embodiment, the road and/or lane vehicles are in acts as a communications bus for message. That is, in some embodiments, a roadway may include one or more digital "tags" (e.g., installed near lane marks of a roadway) that forms a communications networks in which vehicles can communicate. Further detail on these tags is provided in U.S. application Ser. No. 15/993,119, filed May 30, 2018 entitled "TRANSMISSION OF VEHICLE ROUTE INFORMATION BY PASSIVE DEVICES", incorporated herein by reference in its entirety. In alternative embodiments, vehicles may communicate directly with each other in a peer-to-peer fashion. In the first embodiment, a vehicle "logs" onto a road by exchanging public $L_1$ keys with the road. In some embodiments, the vehicle may further transmit its vehicle identification number (VIN) to the roadway; this is referred to as an "authenticated session" whereas the lack of transmitting a VIN is referred to as an "anonymous" session. If the vehicle is logged on via an authenticated session, the vehicle may provide more information to the roadway and receive personal services. However, in either case, the vehicle will be able to receive messages and transmit operational data to the roadway even if logged in anonymously.

Thus, in step 102, multiple vehicles are operating on a roadway (including a target vehicle) and are in communication with the roadway and, in some embodiments, with each other directly. However, for purposes of the following discussion it is presumed that in step 102 only one vehicle is operating on a roadway.

In step 104, the vehicle and/or roadway determines if another vehicle is nearby. Details regarding obstacle detection will be discussed in a separate embodiment. For this Figure, a nearby vehicle refers to a vehicle on the side or in front of the target vehicle. In some embodiments, the method may identify a nearby vehicle by being informed by the roadway itself. Alternatively, the target vehicle may use sensor readings to confirm or replace this mechanism. Alternatively, the approaching vehicle may broadcast its presence via near-field communications, 5GLTE, DSRC or another short-range communications protocol. If no vehicle is detected, the method continues to operate the target vehicle as described.

In one embodiment, step 104 may further comprise confirming that the detected vehicle is in fact able to be communicated with. For example, in a blind spot detection system, the target vehicle may specify a maximum of two vehicles that can establish connections with the target vehicle. If these connections are not release, the method may ignore any further vehicles. Additionally, the target vehicle may utilize cameras or other sensors to analyze road markings to determine if lanes existing on both sides of the target vehicle. If only one lane exists, the target vehicle may reduce the number of allowed connections to one.

In step 106, however, if a nearing vehicle is detected, the method authenticates the triples of the vehicles. In the blindside detection embodiments, this comprises first identifying that one or two vehicles are approaching a secure channel area (discussed infra) and authenticating the triples of the two or three vehicles. In the following distance embodiments, this step relates to detecting the presence of a vehicle in front of or behind a target vehicle and authenticating the two or three vehicles.

In general, the authentication procedure comprises the target vehicle transmitting its $L_1$ triple to another vehicle. The receiving vehicle checks the certificate to verify the target vehicle identity and generates its own $L_2$ triple to send to the target vehicle which, in turn, verifies the certificate in the $L_2$ triple to confirm the identity. Once these two confirmations are successful, both participants can ensure the identity of the other.

In step 108, the method confirms these verifications and if either of the verifications fails, the method ends.

In step 110, the method establishes a secure channel between the target vehicle and one or more other vehicles. In one embodiment, the secure channel comprises a TLS channel or similar channel that includes the verified public key information and other security details.

In steps 112-120, the vehicles exchange messages.

In step 112, the target vehicle sends a data request message.

Figure 5:
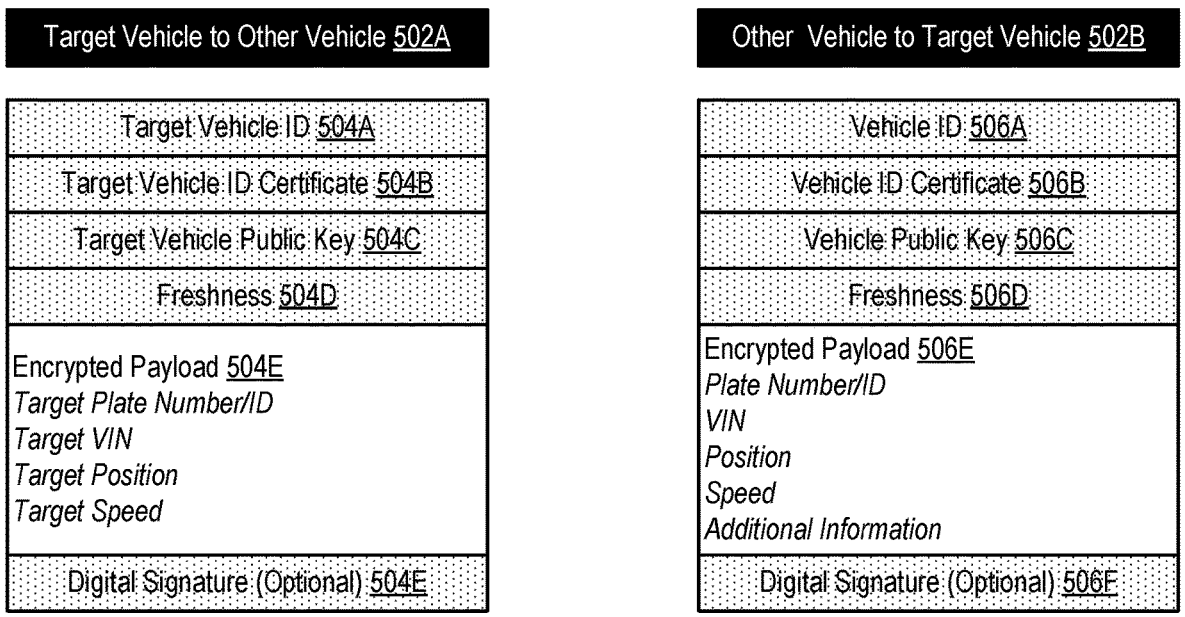
FIG. 5 is a diagram of message packets according to some embodiments of the disclosure.

Details of the message format are described in FIG. 5, which is incorporated by reference in its entirety. Generally, the target vehicle will send a message to vehicles on the sides of the target vehicle upon detecting an overtaking vehicle or in front of/behind the target vehicle. The message will include the position and speed of the target vehicle. Additionally, the message includes the target vehicle's triple for authentication purposes.

In step 114, the target vehicle receives a response message.

Upon receiving the message from the target vehicle, the receiver will verify the authenticity of the message by verifying the certificate in the triple. If the message is valid, the receiver will transmit a message with its position and speed as well as any useful additional information. Additional information may comprise a target speed, a driving plan, or other information to describe how the vehicle intends to operate in the near future. Additional information may also include a formal acknowledgement of the message or a proposed plan of action for the target vehicle (e.g., to "make way" for the receiver vehicle).

In step 116, the target vehicle verifies the authenticity of the response.

As briefly discussed above, the target vehicle verifies the response from the recipient vehicle. As illustrated in FIG. 5, the response message includes the senders triple. Thus, in step 116, the target vehicle can verify the authenticity of the sender by utilizing the certificate checker described in FIG. 4B.

In step 118, the method checks the result of the verification.

Figure 4A:
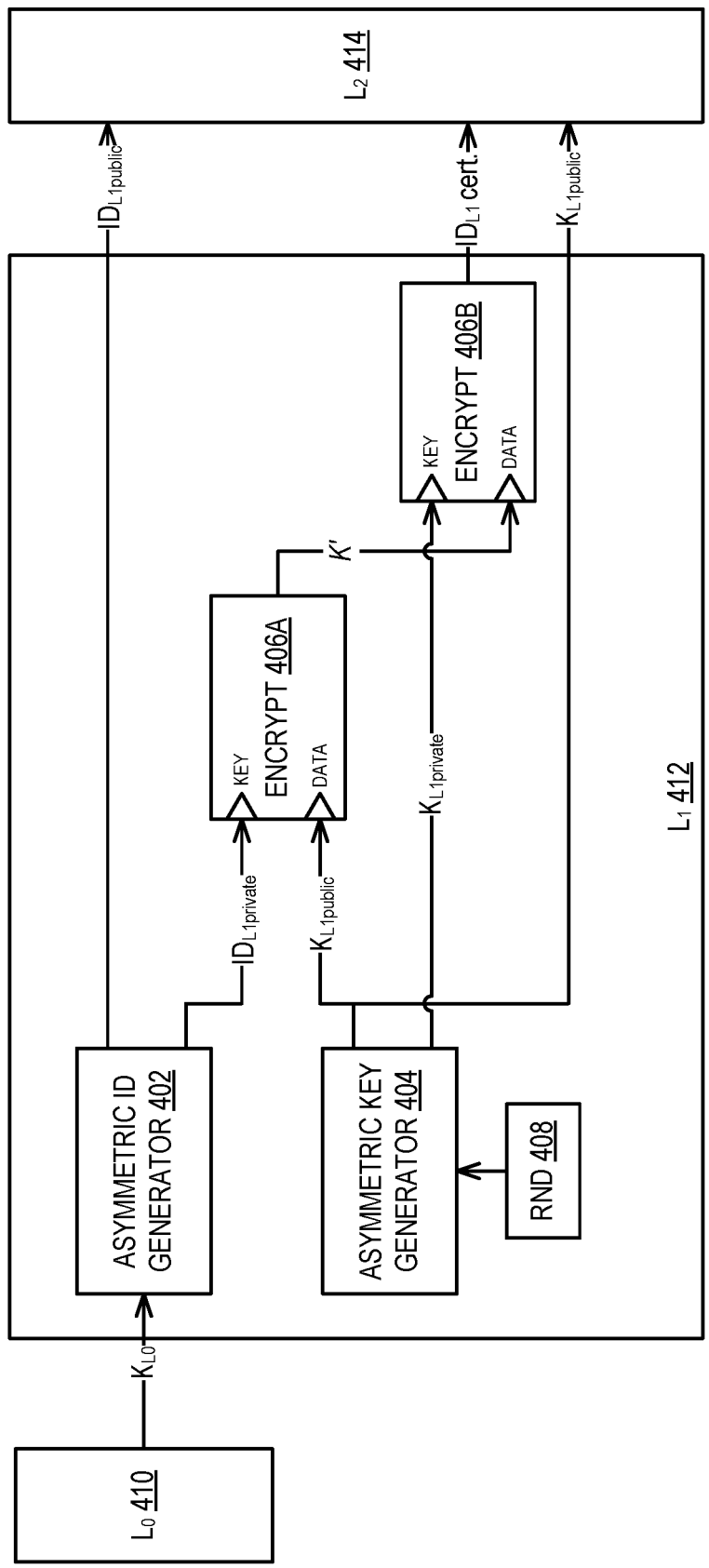
FIG. 4A illustrates an apparatus or non-transitory computer readable storage medium for generating a triple according to some embodiments.
Figure 4B:
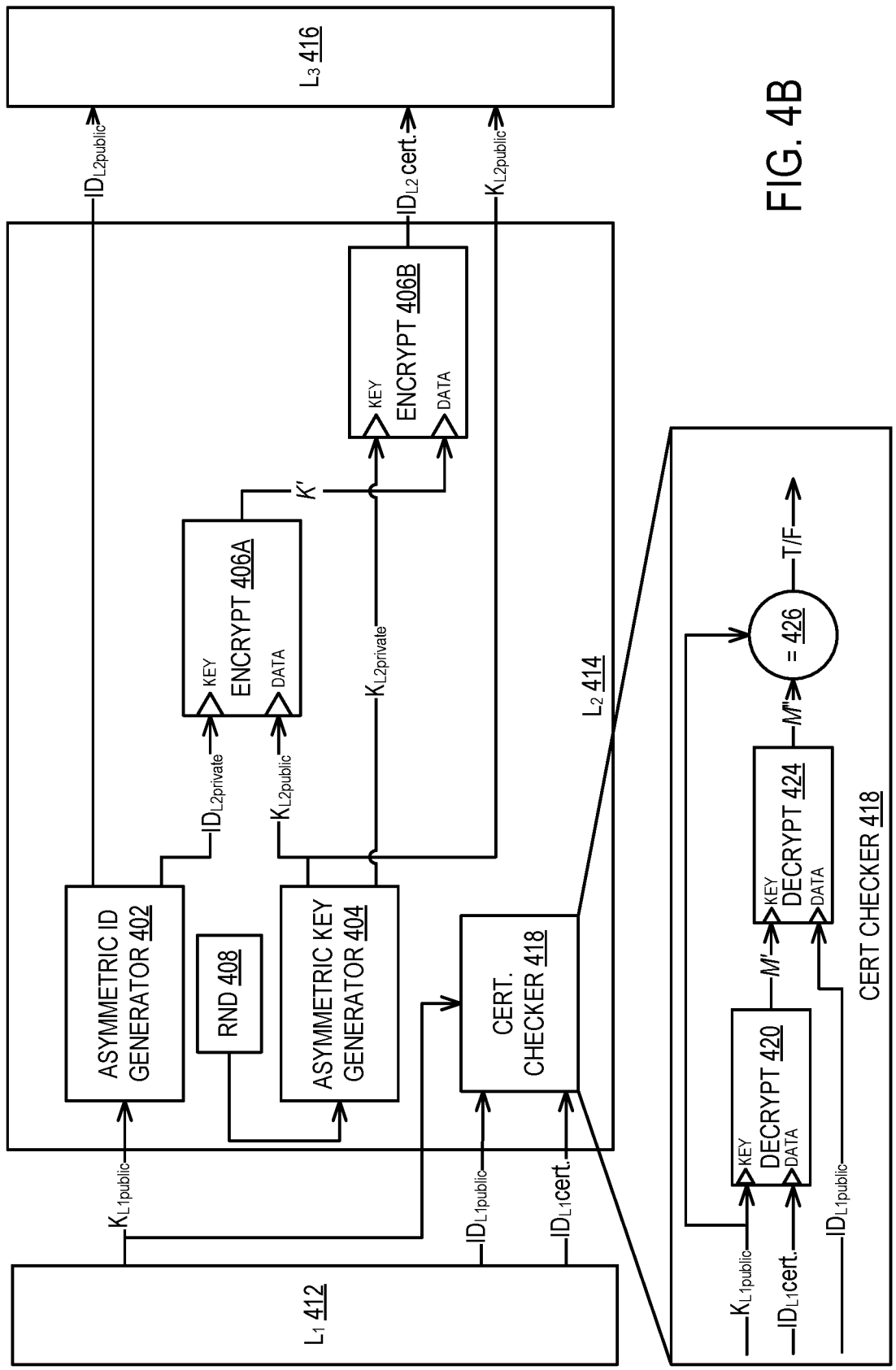
FIG. 4B illustrates an apparatus or non-transitory computer readable storage medium for verifying a triple and generating a second layer triple according to some embodiments.

In one embodiment, this check comprises the comparator operation described in FIG. 4B. Additionally, however, the method may implement one or more logical checks to confirm that the response is accurate. Note that these checks may also be performed in step 104 as well.

Specifically, in the blind spot detection scenario, the method may confirm that the data in the message indicates that the sender of the message is travelling in the same direction as the target vehicle. Alternatively, or in conjunction with the foregoing, the verification may comprise determining that the vehicle is in a lane adjacent to the target vehicle.

In step 120, the method discards the response if the verification fails.

In the illustrated embodiment, discarding the response comprises ignoring the response. In some embodiments, the target vehicle may retransmit the message to the receiver to attempt to obtain a valid response.

In step 122, the method controls the vehicle based on the response if the verification passes.

Note that step 122 may be performed by both the target vehicle and other vehicles. Generally, the above process (steps 112-124) are repeated rapidly while a vehicle is in the secure channel area and a connection is established (e.g., once every microsecond, although the specific interval is not intended to be limiting). Thus, step 122 is performed rapidly by both vehicles based on the most recent position and speed of the vehicles. Various examples of controlling a vehicle are described herein and will be explained in more detail in later figures.

In a blind spot detection system, the target vehicle may be controlled by preventing movement in a left or right direction while a vehicle is connected to the target vehicle in the respective lanes. Alternatively, or in conjunction with the foregoing, the target vehicle may reduce speed to allow for passing by the overtaking vehicle. Alternatively, or in conjunction with the foregoing, the overtaking vehicle may briefly increase speed to overtake a target vehicle upon receiving a notification that the target vehicle is maintaining its current speed.

In the following distance system, a target vehicle may communicate with a lead vehicle and briefly reduce its speed to maintain a preset distance and thereafter synchronize its speed to match the lead vehicle. The target vehicle may also transmit its current and/or planned speed to a following vehicle wherein the following vehicle may reduce its speed then match the target vehicle's speed. In some embodiments, the target vehicle may change its position to an adjacent lane, increase its speed, and broadcast the same to the lead vehicle. The lead vehicle may then maintain its speed (and trigger the blind spot detection algorithms) to allow the target vehicle to overtake the lead vehicle.

In step 124, the method determines if the receiver vehicle is still in range.

As illustrated above, two vehicles are only communicating with respect to blind spot detection and following distance detection when a vehicle is within a secure channel area of another. This may be detected using LiDAR, radar, sonar, etc. as described above. Thus, in step 124 the method checks to see if a vehicle associated with a connection is still within the secure channel area and repeats steps 112-122 if so.

In step 126, the method releases the connection if the receiver vehicle is not still in range.

As described above, the target vehicle maintains a limited number of available connections to prevent excessive communications. Once the vehicle overtakes the target or is otherwise not in the secure channel area, the target vehicle releases the connection and repeats the method for future vehicles.

FIG. 2A is a flow diagram illustrating a method for maintaining a connection pool according to some embodiments of the disclosure. Aspects of the method have been described previously, and those relevant aspects are incorporated in the description of FIG. 2A.

In step 202, the method scans the road with a camera. In one embodiment, the method uses cameras to capture images of the roadway to the left and right of the vehicle. These images are input into a classification algorithm (e.g., a convolutional neural network or similar deep learning model) to classify the road features of the images. These road features primarily include whether a lane exists on the left and right of the vehicle. A lane does not exist if the left or right image depicts a non-roadway surface. However, a lane also not does not "exist" if the markings separating the lanes are solid lines or if there is a physical barrier between the lanes.

In step 204, the method determines how many lanes on the left and right were identified. If the number of lanes is zero the method end (but may be re-executed upon detecting a change in lane numbers). If the number of lanes is one, the method enables a mono channel (step 206). If the number of lanes is two, the method enables a dual channel (step 208). A mono channel refers to a channel that will only allow one secure connection at a time while a dual channel will allow for two concurrent secure connections.

After establishing a channel, the method awaits overtaking vehicles. In step 210, the method eventually detects an overtaking vehicle, as described more fully in FIG. 1.

In response, the method undertakes a second check, specifically, checking whether the vehicle is traveling in the same direction, step 212. This check may be done by analyzing sensor records of the moving vehicle. Alternatively, the check may comprise analyzing at least two consecutive positions of the moving vehicle and comparing the trajectory to the target vehicles trajectory.

If the overtaking vehicle is not traveling in the same direction as the target vehicle, the method ends. However, if the overtaking vehicle is traveling in the same direction, the method establishes a secure connection, step 214. In one embodiment, by establishing a secure connection the method decrements the number of available connections. In one embodiment, not illustrated, the method includes an additional check before step 214 to confirm that the number of connections (0, 1, or 2) is greater than zero and only enables the connection if so.

FIG. 2B is a flow diagram illustrating a method for controlling a target vehicle by a blind spot detection system according to some embodiments of the disclosure. As will be discussed, the method in FIG. 2B may be implemented by either a target vehicle or an overtaking vehicle.

In step 216, a target vehicle and one or more overtaking vehicles exchange packets in the manner described in FIG. 1.

In step 218, the method maintains the operating speed and route of a vehicle. In one embodiment, step 218 may comprise maintaining the speed of a target vehicle during. Simultaneously, step 218 may comprise maintaining an acceleration or speed of an overtaking vehicle. Additionally, the method may synchronize routing (e.g., lane changes) to prevent the vehicles from changing lanes during the connection.

In step 220, the method determines if the connection between two vehicles is still active. If the connection is still active, the method continues to execute step 218, coordinating the speed and routes of all vehicles connected to the target vehicle, as well as the target vehicle itself.

In step 222, after the connection is released, the vehicles associated with the connection are returned to an ordinary operation status. In ordinary operation status, the vehicles coordinate operations independently of other vehicles, as known in the art.

Figure 3A:
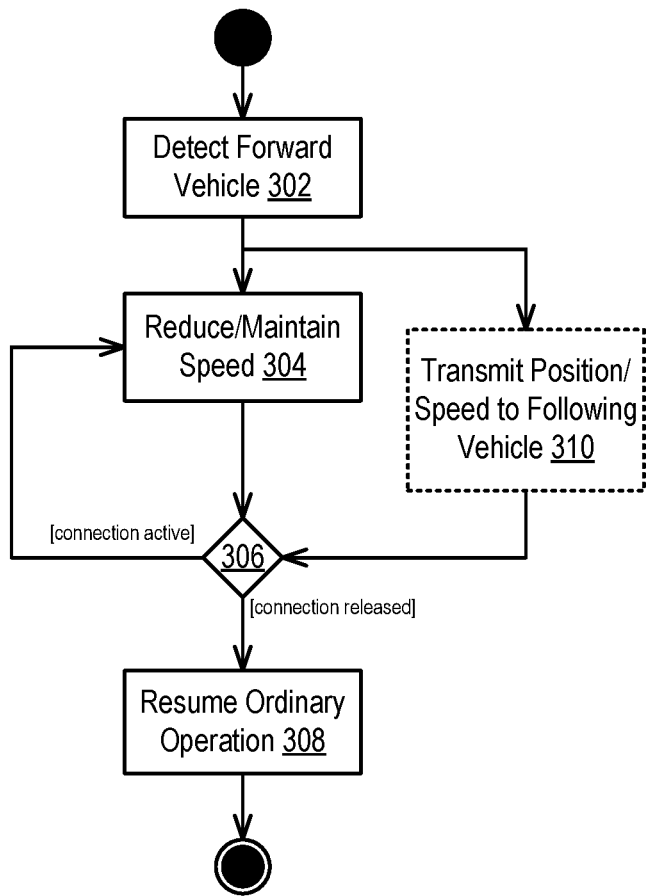
FIG. 3A is a flow diagram illustrating method for maintaining a following distance using a secure channel according to some embodiments of the disclosure.

FIG. 3A is a flow diagram illustrating method for maintaining a following distance using a secure channel according to some embodiments of the disclosure.

In step 302, the method detects a vehicle in front of a target vehicle. In one embodiment, this may be done via message passing or via sensor reading (both described previously). As part of detecting the forward vehicle, the method may receive the position and speed of the forward vehicle (identical to that in step 310, as will be explained).

In some embodiments, the secure channel area can be created dynamically based on the speed of the target area. For example, the faster the vehicle is travelling, the larger the front and back secure channel area.

In step 304, the method reduces or maintains its speed after detecting the forward vehicle. Specifically, the method calculates the distance between the position of the forward and the target vehicle (e.g., the Euclidean distance). The method then calculates the ideal following distance using the formula $$d_{ideal} = \left(\frac{speed_{target}}{10}\right)^2,$$

where $speed_{target}$ is a unit-less value of the current velocity and wherein $d_{ideal}$ is a distance in meters (e.g., the target distance at 80 km/h is $8^2$ m or 64 m). If the current distance is greater than or equal to the ideal distance, the method in step 304 adjusts the target vehicles speed to match the forward vehicles speed. If the ideal distance is greater than the current distance, the method reduces the speed of the target vehicle until the actual distance is equal to or greater than the ideal distance. If the ideal distance is shorter than the actual distance, the method may allow the vehicle to operate normally until the ideal distance is met.

Simultaneously, with step 304, the method may also transmit its position/speed to a vehicle behind the target vehicle if one exists. In this manner, the following vehicle can adjust its speed in a manner similar to the target vehicle; indeed, employing the same routine just discussed.

The method continues this adjustment until the connection is released (step 306). Generally, the connection would be released once the forward vehicle is no longer in range of the target vehicle. This can occur because the forward vehicle leaves the road, increases its speed to be out of range etc.

Once the connection is released, the target vehicle resumes ordinary standalone operations, step 308. In some embodiments, a connection is released when the target vehicle is not within a visible area of other vehicles. In other embodiments, the connection is released when the target vehicle is not in the same lane as other vehicles.

Figure 3B:
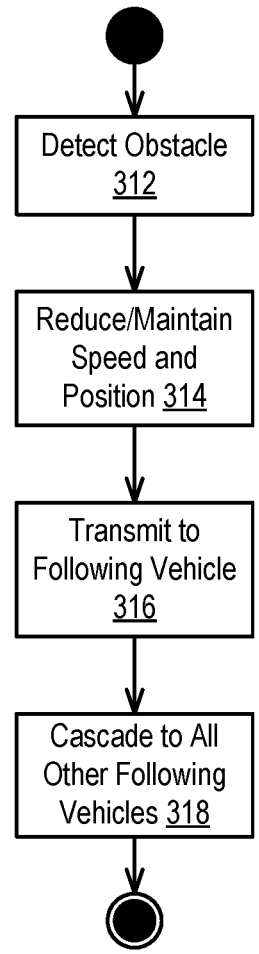
FIG. 3B is a flow diagram illustrating a method for controlling vehicles using a secure control channel upon detecting an obstacle according to some embodiments of the disclosure.

FIG. 3B is a flow diagram illustrating a method for controlling vehicles using a secure control channel upon detecting an obstacle according to some embodiments of the disclosure.

In step 312, the method detects an obstacle. In one embodiment, an obstacle can be detected using sensor-based techniques known in the art. An obstacle comprises a transient issue on a roadway that requires deviation from a set route of a vehicle such as debris, an accident, a natural disaster, etc.

In step 314, the target vehicle reduces or maintains its speed or adjusts its position (i.e., route) based on the obstacle. Various ADASs exist for accident avoidance and the details of those systems are not repeated herein. In general, the systems adjust the position and speed or acceleration of a vehicle to avoid a collision with an obstacle detected via one or more sensors.

In the illustrated embodiment, the target vehicle may have established a secure channel with a following vehicle (as described in FIG. 1). In this manner, the target vehicle transmits its position and speed to the following vehicle (step 316) upon detecting the obstacle. In some embodiments, the method may also transmit the location of the obstacle, its estimated dimensions, etc.

In step 318, the following vehicle relays the message to any other following vehicles, which in turn continue "passing" the message to other following vehicles. In response, each following vehicle may receive the position of the obstacle and the position/speed of the vehicle ahead of it. Thus, the method allows for a "chain" of vehicles to recognize an obstacle and avoid the obstacle in a platoon like fashion.

FIG. 4A illustrates an apparatus or non-transitory computer readable storage medium for generating a triple according to some embodiments.

As illustrated, the $L_0$ software (410) and $L_1$ software (412) operate on a first device. The $L_0$ code (410) comprises firmware executing in ROM of the device. The $L_0$ code (410) is responsible for generating a first key ($K_{L0}$) (also referred to as a fuse-derived secret, FDS) according to the following formula:

$$FDS = K_{L0} = KDF(UDS, \text{HASH (identify of } L_1)) \quad \text{EQUATION 2}$$

where KDF is a one-way function such as an HMAC-SHA256 function, UDS is a unique device secret set during manufacture of the device operating the $L_0$ code (410), HASH comprises a second one-way function such as a SHA256 function, and the identify of $L_1$ comprises host configuration parameters of the $L_1$ code (412).

The $L_0$ code (410) exports $K_{L0}$ to the $L_1$ code (412) which is then used to generate a triple representing the $L_1$ code (412). This triple (depicted in EQUATION 1) is then exported by the $L_1$ code (412) to the $L_2$ code (414). As discussed, the $L_2$ code (414) can comprise code executing on an external device or, in some embodiments, a remote device. For example, the $L_0$ code (410) and $L_1$ code (412) can execute on a first vehicle while the $L_2$ (414) can execute on a separate vehicle. As another example, the $L_0$ code (410) and $L_1$ code (412) can execute on the roadway while the $L_2$ (414) can execute on a vehicle.

Operation of the $L_1$ code (412) is described in more detail herein. Generally, as described, the $L_1$ code (412) is responsible for generating keys (referred to as "alias keys") and a triple for the $L_1$ code (412) itself.

As illustrated, the $L_1$ code (412) generates an identifier for the $L_1$ code (412) via an asymmetric identifier generator (402). The generator (402) takes the $K_{L0}$ key as a seed input and outputs a deterministic public key ($ID_{L1public}$) and private key ($ID_{L1private}$). The $L_1$ code (412) exports the public key ($ID_{L1public}$) to the $L_2$ code (414), the usage of which will be described in the description of FIG. 4B.

Additionally, the $L_1$ code (412) generates a second key pair using a second asymmetric key generator (404). This key generator (404) takes a random number generated by the random number generator (408) as a seed input and outputs a second deterministic public key ($K_{L1public}$) and private key ($K_{L1private}$). The $L_1$ code (412) exports the public key ($K_{L1public}$) to the $L_2$ code (414), the usage of which will be described in the description of FIG. 4B.

The $L_1$ code (412) additionally employs a double-encryption technique for generating the ID certificate portion of the triple exported to the $L_2$ code (414). Specifically, the $L_1$ code (412) first encrypts the $K_{L1public}$ key using the $ID_{L1public}$ key as the encryption key using a first encryption module (406a), generating encrypted ciphertext K'. This ciphertext is then used as the data supplied to a second encryption module (406b) while the $K_{L1private}$ generated by the second generator (404) is used as the encryption key. The result of the second encryption module (406B) is a doubly-encrypted ciphertext K'' which is exported as the $ID_{L1}$ certificate. The specific choice of encryption algorithm (and corresponding decryption algorithm in FIG. 4B) is not limited in the disclosure.

FIG. 4B illustrates an apparatus or non-transitory computer readable storage medium for verifying a triple and generating a second layer triple according to some embodiments. The figure illustrated in FIG. 4B illustrates the operation of $L_2$ code (414). However, the operations described herein can be generalized for any layer including and beyond the $L_2$ code (414) (e.g., $L_3$ code 416).

In the illustrated embodiment, the $L_2$ code (414) receives a triple from $L_1$ code (412), generated as described in FIG. 4A. $L_2$ code (414) performs operations similar to that of $L_1$ code (412) with respect to generating a $L_2$ triple and those details are not repeated herein but are incorporated by reference for identically numbered elements. One notable difference in the triple-generation circuity or software is that the first generator is seeded with the $K_{L1public}$ value generated by the $L_1$ code (412) and not the value of $K_{L0}$ (the fuse-derived secret) as described in FIG. 4A.

Additionally, the $L_2$ code (414) includes a certificate checker (418) which may be implemented in hardware (i.e., a dedicated circuit) or in software or firmware. Details of the certificate checker (418) are shown in exploded view in the figure. The certificate checker (418) verifies the authenticity of the triple received from the $L_1$ code (412). In some embodiments, the certificate checker (418) acts as a gating function to the remaining components (i.e., preventing the generation of an $L_2$ triple if the triple is not valid).

As illustrated, the certificate checker (418) decrypts the $ID_{L1}$ certificate using the $K_{L1}$ public key via first decryption module (420). The resulting key M' is then used as the key for a second decryption module (424) which use the key M' to decrypt the $ID_{L1}$ public key. Finally, the resulting plaintext M" is compared to the original public key ($K_{L1public}$) via comparator (426). If the result of the comparator is positive, the triple is confirmed as valid. If not, the triple is marked as invalid.

In the illustrated embodiment, the certificate checker (418) can execute independently of the triple generation circuity/software (402, 404, 406a-b). In this manner, triples of various entities can be verified by the $L_2$ code (414).

FIG. 5 is a diagram of message packets according to some embodiments of the disclosure.

The illustrated embodiment depicts a packet (502a) sent from a target vehicle to other vehicles in secure channel area and a packet (502b) sent from vehicles in a secure channel area to other vehicles.

Both packets (502a, 502b) include a triple (504a-504c, 506a-506c) that includes the cryptographic identifier, certificate, and public key of the sender (described elsewhere). These triples (504a-504c, 506a-506c) provides the cryptographic identity of the sender and can be used by the receiver to generate a $L_2$ triple.

Both packets (502a, 502b) include a freshness field (504d, 506d). This field can comprise a timestamp, monotonic counter, or other unique value that prevents replay attacks.

Both packets (502a, 502b) include an optional digital signature signed by the sender using their private key and verified with their public key. In one embodiment, the sender can further encrypt the message with the public key of the receiver and the receiver decrypt the message received with its own private key corresponding to that public key.

Both packets (502a, 502b) include a payload (504e, 506e) that includes the senders license plate number/identifier, VIN, current position (GPS/VGPS), and speed. Additionally, the message (502b) includes additional information as described previously.

Figure 6:
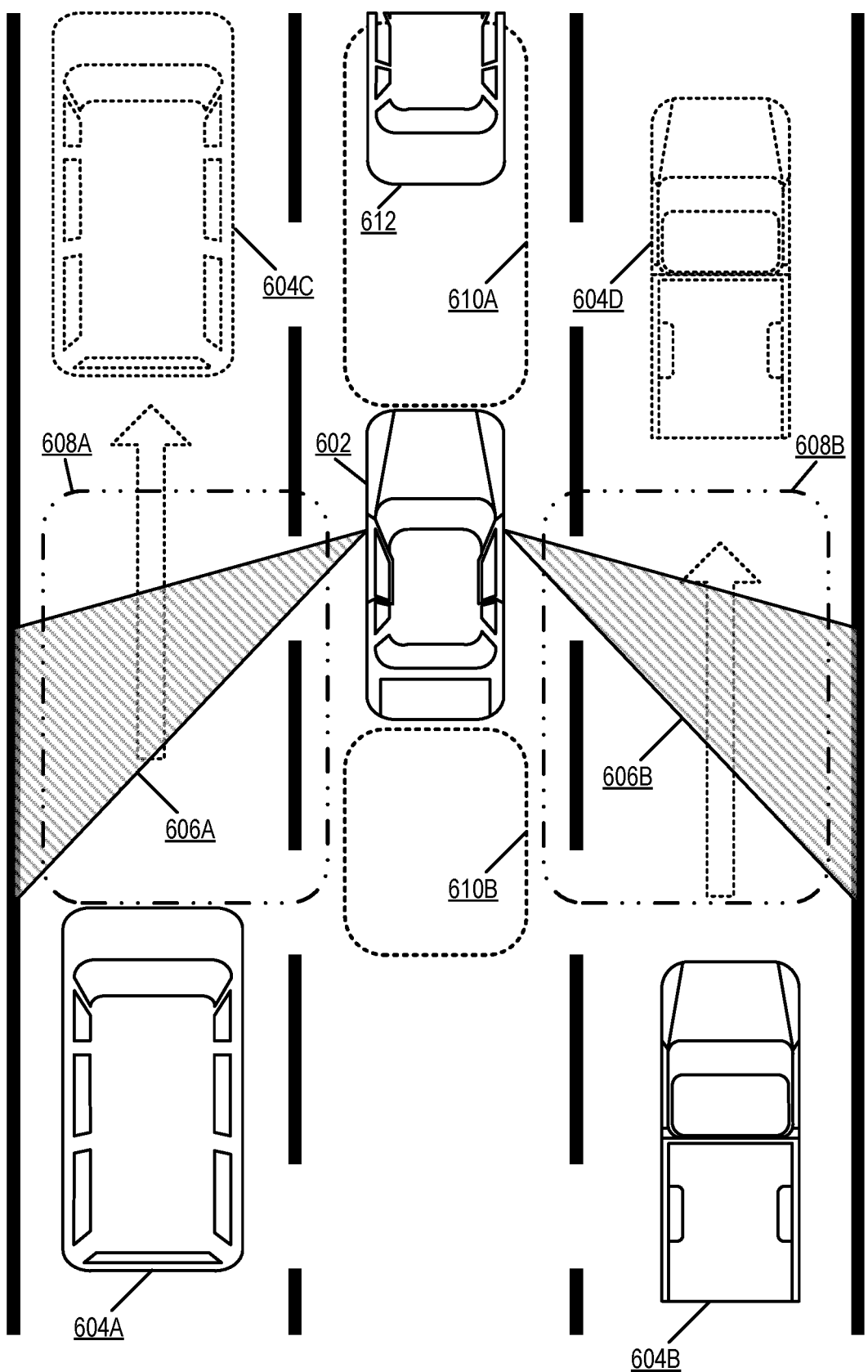
FIG. 6 is a diagram of a roadway with vehicles according to some embodiments of the disclosure.

FIG. 6 is a diagram of a roadway with vehicles according to some embodiments of the disclosure.

In the illustrated embodiment, a target vehicle (602) is operating in the middle lane of a roadway. Two other vehicles (604a, 604b) are in the lanes to the left and right of the target vehicle (602) respectively. In the illustrated embodiment, other vehicles (604a, 604b) are operating at a higher velocity than vehicle (602) and thus, at a later time will be positioned at positions (604c, 604d), thus overtaking target vehicle (602).

Target vehicle (602) has natural blind spots (606a, 606b) due to the nature of the side-view mirrors installed on target vehicle (602). Thus, as illustrated, two secure channel areas (606a, 606b) are defined for the vehicle. Once a vehicle (604a, 604b) enters these areas (606a, 606b), a connection is established and the vehicle speeds and positions are controlled in accordance with the aforementioned embodiments.

In addition to blind spot secure channel areas (608a, 608b), two distance detection secure channel areas (610a, 610b) are illustrated in front of, and behind, the target vehicle (602), respectively. As described above, these areas may vary in size based on the speed of the vehicle. As illustrated, they may also vary based on the position of the area. For example, area (610a) is longer than area (610b) to prevent rear-end collisions.

Further, as illustrated vehicle (612) is within the secure channel area (610a) and thus has established a secure connection with target vehicle (602). Thus, in the illustrated scenario, target vehicle (602) maintains its speed to keep the distance between vehicle (612).

The following examples are provided merely to describe, visually, the secure channel areas described previous. All previous discussion regarding secure channel areas is hereby incorporated by reference in its entirety.

Figure 7:
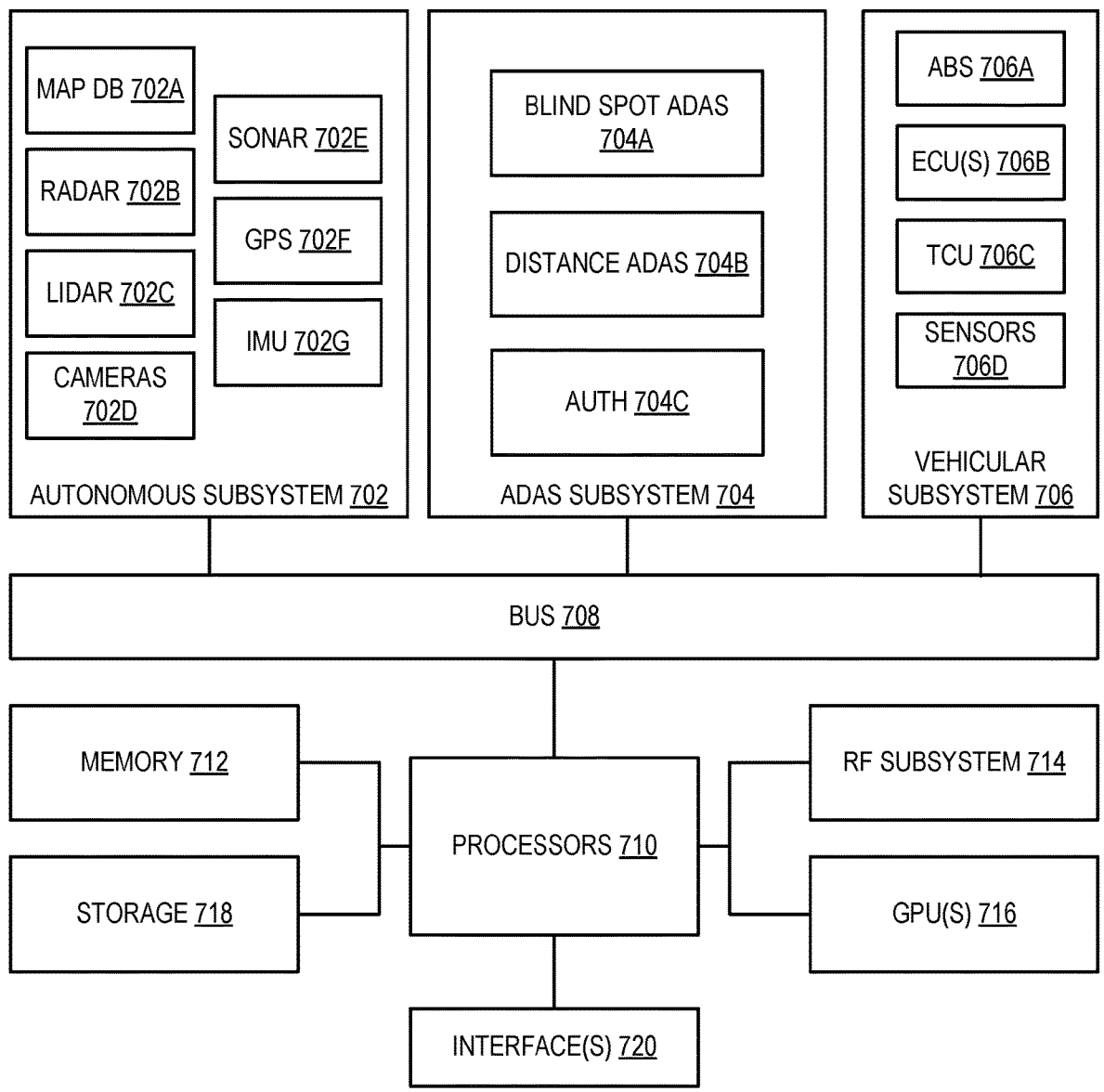
FIG. 7 is a block diagram of a vehicle according to some embodiments of the disclosure.

FIG. 7 is a block diagram of a vehicle according to some embodiments of the disclosure.

The system illustrated in FIG. 7 may be installed entirely within a vehicle. In some embodiments, some components (e.g., components and subsystems other than subsystem (704)) may comprise existing autonomous and non-autonomous vehicle subsystems.

The system optionally includes an autonomous vehicle subsystem (702). In the illustrated embodiment, autonomous vehicle subsystem (702) includes map database (702A), radar devices (702B), Lidar devices (702C), digital cameras (702D), sonar devices (702E), GPS receivers (702F), and inertial measurement units (702G). Each of the components of autonomous vehicle subsystem (702) comprise standard components provided in most current autonomous vehicles. In one embodiment, map database (702A) stores a plurality of high-definition three-dimensional maps used for routing and navigation. Radar devices (702B), Lidar devices (702C), digital cameras (702D), sonar devices (702E), GPS receivers (702F), and inertial measurement units (702G) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality. In some embodiments the autonomous subsystem (702) is built into the vehicle while in other embodiments the autonomous subsystem (702) comprises an aftermarket system.

Vehicular subsystem (706) is additionally included within the system. Vehicular subsystem (706) includes various anti-lock braking systems (706A), engine control units (706B), transmission control units (706C), and sensors (706D). These components may be utilized to control the operation of the vehicle in response to the data generated by autonomous vehicle subsystem (702) and/or ADAS subsystem (704). The standard autonomous vehicle interactions between autonomous vehicle subsystem (702) and vehicular subsystem (706) are generally known in the art and are not described in detail herein.

The processing side of the system includes one or more processors (710), short-term memory (712), an RF system (714), graphics processing units (GPUs) (716), long-term storage (718) and one or more interfaces (720).

The one or more processors (710) may comprise central processing units, FPGAs, or any range of processing devices needed to support the operations of the autonomous vehicle.

Memory (712) comprises DRAM or other suitable volatile RAM for temporary storage of data required by processors (710). RF system (714) may comprise a cellular transceiver and/or satellite transceiver. Long-term storage (718) may comprise one or more high-capacity solid-state drives (SSDs). In general, long-term storage (718) may be utilized to store, for example, high-definition maps, routing data, and any other data requiring permanent or semi-permanent storage. GPUs (716) may comprise one or more high throughput GPU devices for processing data received from autonomous vehicle subsystem (702A). Finally, interfaces (720) may comprise various display units positioned within the autonomous vehicle (e.g., an in-dash screen).

The system additionally includes an ADAS subsystem (704) which performs the operations required by the methods illustrated in the preceding Figures. The ADAS subsystem (704) includes a blind spot ADAS (704a) and distance ADAS (704b) which perform the blind spot algorithms described in FIGS. 1, 2A, and 2B and the distance detection algorithms described in FIGS. 1, 3A, and 3B, respectively. The outputs of these systems control the components of vehicular subsystem (706) in the manner described. Further, the ADAS subsystem (704) includes an authentication system (704c) which may comprise a RIoT core and higher-level software/circuitry, as described throughout the specification.

Each of the devices is connected via a bus (708). In one embodiment, the bus (708) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   establishing, by a first vehicle, a secure channel area extending from at least one side of the first vehicle, the secure channel area generated based on classifying images of a roadway surrounding the first vehicle;
   detecting, by the first vehicle, a presence of a second vehicle in the secure channel area;
   establishing, by the first vehicle, a secure connection with the second vehicle upon detecting the presence;
   transmitting, by the first vehicle, a first message to the second vehicle, the first message including a first speed of the first vehicle;
   receiving, by the first vehicle, a second message from the second vehicle, the second message including a second speed of the second vehicle;
   transmitting, by the first vehicle, based on the detecting of the presence of the second vehicle in the secure channel area, a third message to the second vehicle instructing the second vehicle to change its speed from the second speed to a third speed, the third message signed by the first vehicle;
   taking control, by the first vehicle, of a position and speed of the first vehicle; and
   releasing control, by the first vehicle, of the position and speed of the first vehicle upon detecting that the secure connection was released.

2. The method of claim 1, the establishing the secure channel area extending from at least one side of the first vehicle comprising establishing the secure channel area on a left or right side of the first vehicle.

3. The method of claim 1, the establishing the secure channel area extending from at least one side of the first vehicle comprising establishing the secure channel area on a front or rear side of the first vehicle.

4. The method of claim 1, the establishing the secure connection comprising confirming that a connection pool has at least one available connection prior to establishing the connection and, if not, denying the secure connection.

5. The method of claim 1, further comprising exchanging messages between the first vehicle and the second vehicle comprising transmitting signed messages between the first and second vehicles, the signed messages including a triple identifying a cryptographic identifier, public key, and certificate of a sending vehicle.

6. The method of claim 5, the exchanging messages between the first vehicle and the second vehicle comprising verifying signatures associated with the messages.

7. The method of claim 1, the detecting that the secure connection was released comprising detecting that the second vehicle has exited the secure channel area.

8. A non-transitory computer readable storage medium for tangibly storing computer program instructions capable of being executed by a computer processor, the computer program instructions defining steps of:
   establishing, by a first vehicle, a secure channel area extending from at least one side of the first vehicle, the secure channel area generated based on classifying images of a roadway surrounding the first vehicle;
   detecting, by the first vehicle, a presence of a second vehicle in the secure channel area;
   establishing, by the first vehicle, a secure connection with the second vehicle upon detecting the presence;
   transmitting a first message to the second vehicle, the first message including a speed of the first vehicle;
   receiving, by the first vehicle, a second message from the second vehicle, the second message including a second speed of the second vehicle;
   transmitting, by the first vehicle, based on the detecting of the presence of the second vehicle in the secure channel area, a third message to the second vehicle instructing the second vehicle to change its speed from the second speed to a third speed, the third message signed by the first vehicle;
   taking control, by the first vehicle, of a position and speed of the first vehicle; and
   releasing control, by the first vehicle, of the position and speed of the first vehicle upon detecting that the secure connection was released.

9. The non-transitory computer readable storage medium of claim 8, the establishing the secure channel area extending from at least one side of the first vehicle comprising establishing the secure channel area on a left or right side of the first vehicle.

10. The non-transitory computer readable storage medium of claim 8, the establishing the secure channel area extending from at least one side of the first vehicle comprising establishing the secure channel area on a front or rear side of the first vehicle.

11. The non-transitory computer readable storage medium of claim 8, the establishing the secure connection comprising confirming that a connection pool has at least one available connection prior to establishing the connection and, if not, denying the secure connection.

12. The non-transitory computer readable storage medium of claim 8, the steps further comprising exchanging messages between the first vehicle and the second vehicle comprising transmitting signed messages between the first and second vehicles, the signed messages including a triple identifying a cryptographic identifier, public key, and certificate of a sending vehicle.

13. The non-transitory computer readable storage medium of claim 12, the exchanging messages between the first vehicle and the second vehicle comprising verifying signatures associated with the messages.

14. The non-transitory computer readable storage medium of claim 8, the detecting that the secure connection was released comprising detecting that the second vehicle has exited the secure channel area.

15. A device comprising:
a processor; and
a storage medium for tangibly storing thereon program logic for execution by the processor, the stored program logic comprising:
logic, executed by the processor, for establishing a secure channel area extending from at least one side of a first vehicle, the secure channel area generated based on classifying images of a roadway surrounding the first vehicle,
logic, executed by the processor, for detecting a presence of a second vehicle in the secure channel area,
logic, executed by the processor, for establishing a secure connection with the second vehicle upon detecting the presence,
logic, executed by the processor, for transmitting a first message to the second vehicle, the first message including a speed of the first vehicle,
logic, executed by the processor, for receiving a second message from the second vehicle, the second message including a second speed of the second vehicle,
logic, executed by the processor, for transmitting, based on the detecting of the presence of the second vehicle in the secure channel area, a third message to the second vehicle instructing the second vehicle to change its speed from the second speed to a third speed, the third message signed by the first vehicle,
logic, executed by the processor, for taking control of a position and speed of the first vehicle, and
logic, executed by the processor, for releasing control of the position and speed of the first vehicle upon detecting that the secure connection was released.

16. The device of claim 15, the logic for establishing the secure channel area extending from at least one side of the first vehicle comprising logic, executed by the processor, for establishing the secure channel area on a left or right side of the first vehicle.

17. The device of claim 15, the logic for establishing the secure channel area extending from at least one side of the first vehicle comprising logic, executed by the processor, for establishing the secure channel area on a front or rear side of the first vehicle.

18. The device of claim 15, the logic for establishing the secure connection comprising logic, executed by the processor, for confirming that a connection pool has at least one available connection prior to establishing the connection and, if not, denying the secure connection.

19. The device of claim 15, the stored program logic further comprising logic for exchanging messages between the first vehicle and the second vehicle comprising logic, executed by the processor, for transmitting signed messages between the first and second vehicles, the signed messages including a triple identifying a cryptographic identifier, public key, and certificate of a sending vehicle.

20. The device of claim 15, the logic for detecting that the secure connection was released comprising logic, executed by the processor, for detecting that the second vehicle has exited the secure channel area.

* * * * *